March 18, 1958 P. H. HARRER 2,826,985
ROTARY BALER

Filed June 6, 1955 7 Sheets-Sheet 1

Inventor
Paul H. Harrer

March 18, 1958 P. H. HARRER 2,826,985
ROTARY BALER

Filed June 6, 1955 7 Sheets-Sheet 3

Inventor
Paul H. Harrer
By Kenneth Tuckies
Attorney

March 18, 1958 P. H. HARRER 2,826,985
ROTARY BALER
Filed June 6, 1955 7 Sheets-Sheet 4

Inventor
Paul H. Harrer
by Kenneth ........
Attorney

March 18, 1958 P. H. HARRER 2,826,985
ROTARY BALER
Filed June 6, 1955 7 Sheets-Sheet 5

Inventor
Paul H. Harrer
by Kenneth McKiver
Attorney

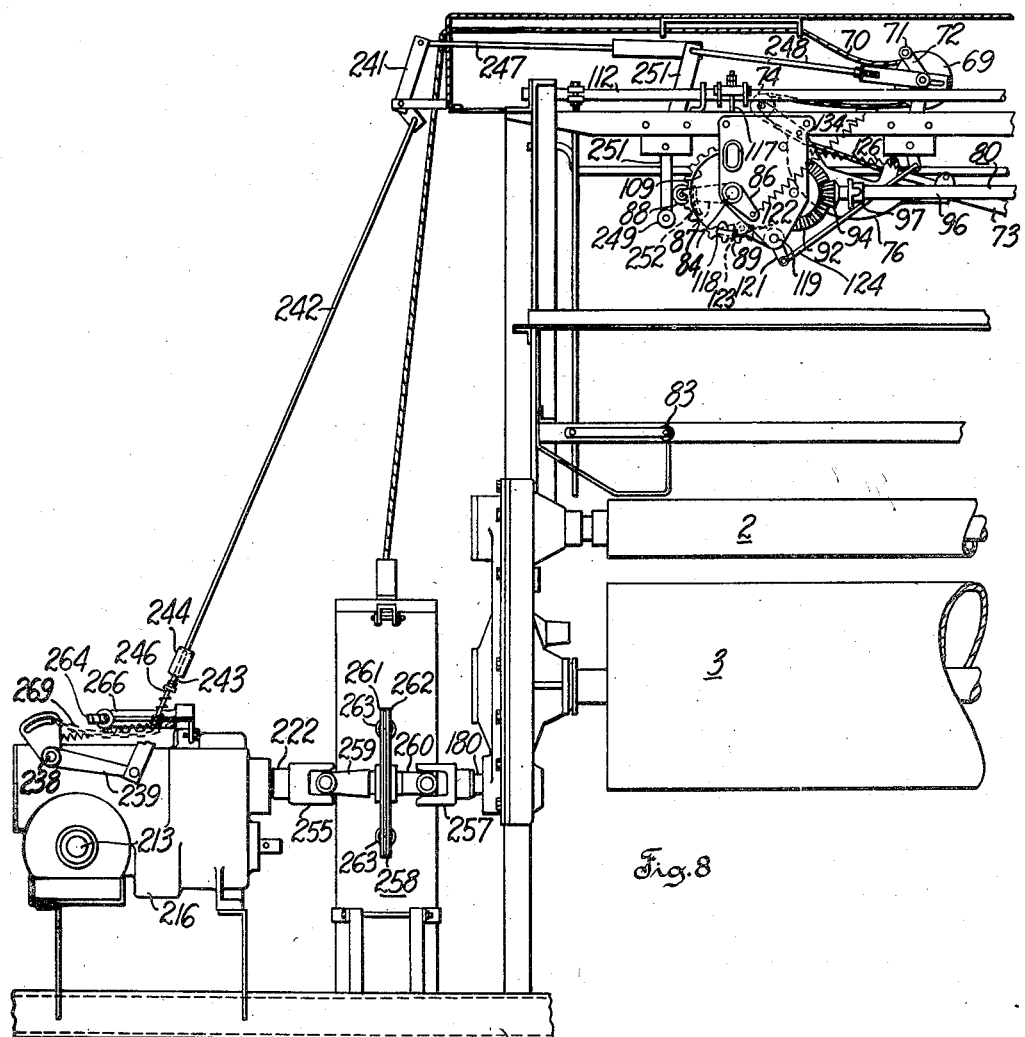
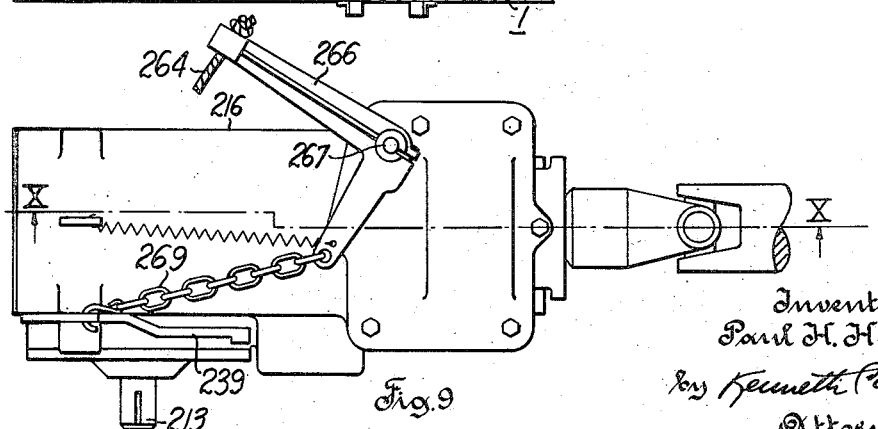

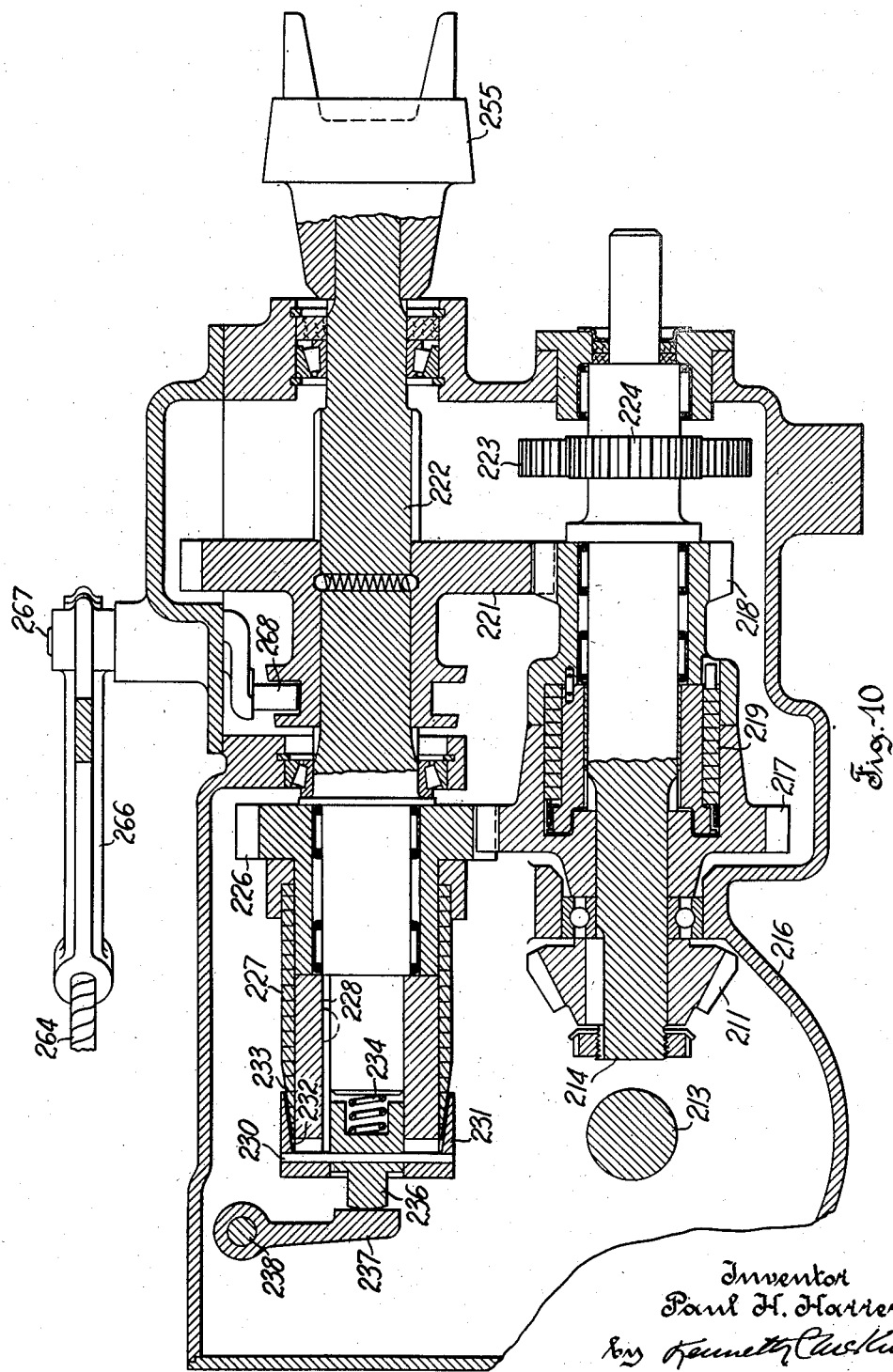

United States Patent Office 2,826,985
Patented Mar. 18, 1958

2,826,985

ROTARY BALER

Paul H. Harrer, La Porte, Ind., assignor to Allis-Chalmers Manufacturing Company, Milwaukee, Wis.

Application June 6, 1955, Serial No. 513,353

14 Claims. (Cl. 100—5)

The present invention pertains to rotary balers incorporating features of improvement advantageously affecting the rolling of hay or the like into a formed cylindrical bale.

Rotary baling machines have heretofore been suggested, as for instance in U. S. Patent 2,468,641, wherein means are positionable to roll fibrous material delivered thereto into a formed and twine wrapped bale of predetermined diameter and positionable to discharge the formed and twine wrapped bale from the machine, and a pickup conveyer which functions to provide the bale forming means with fibrous material and which conveyer is automatically stopped during the twine wrapping and discharging operation.

In this type of machine, it is not possible to continue operation of the conveyer during twine wrapping and discharging operations because such continuation of the conveyer would interfere with these operations. Heretofore the twine wrapping and discharging operation has required as much or more time than it takes to roll the fibrous material into a bale of desired size.

Generally it is an object of this invention to speed up the operating cycle of the machine and thereby increase its material handling capacity.

More specifically, it is an object of this invention to reduce the time required for wrapping twine about the bale and at the same time, wrap the same amount of twine about the bale as would have been wrapped if the time for wrapping had not been reduced.

The significance of the aforementioned objects and the manner in which they may be readily accomplished will become more apparent as the disclosure progresses and particularly points out additional objects, advantages and features of construction which are considered of special importance and of general application although shown and described as applied to a baling machine of the type disclosed in the mentioned U. S. 2,468,641.

Accordingly, the invention may be considered as consisting of the various details of construction, correlation of features and arrangements of parts as is more fully set forth in the appended claims and in the attached description, reference being had to the accompanying drawings, in which:

Fig. 8 is a partial front elevation view similar to Fig. 3 and showing a different embodiment of this invention;

Fig. 9 is an enlarged plan view of the gear box shown in Fig. 8 and connected portions; and Fig. 10 is an enlarged section view taken on line X—X of Fig. 9.

Figure 1:
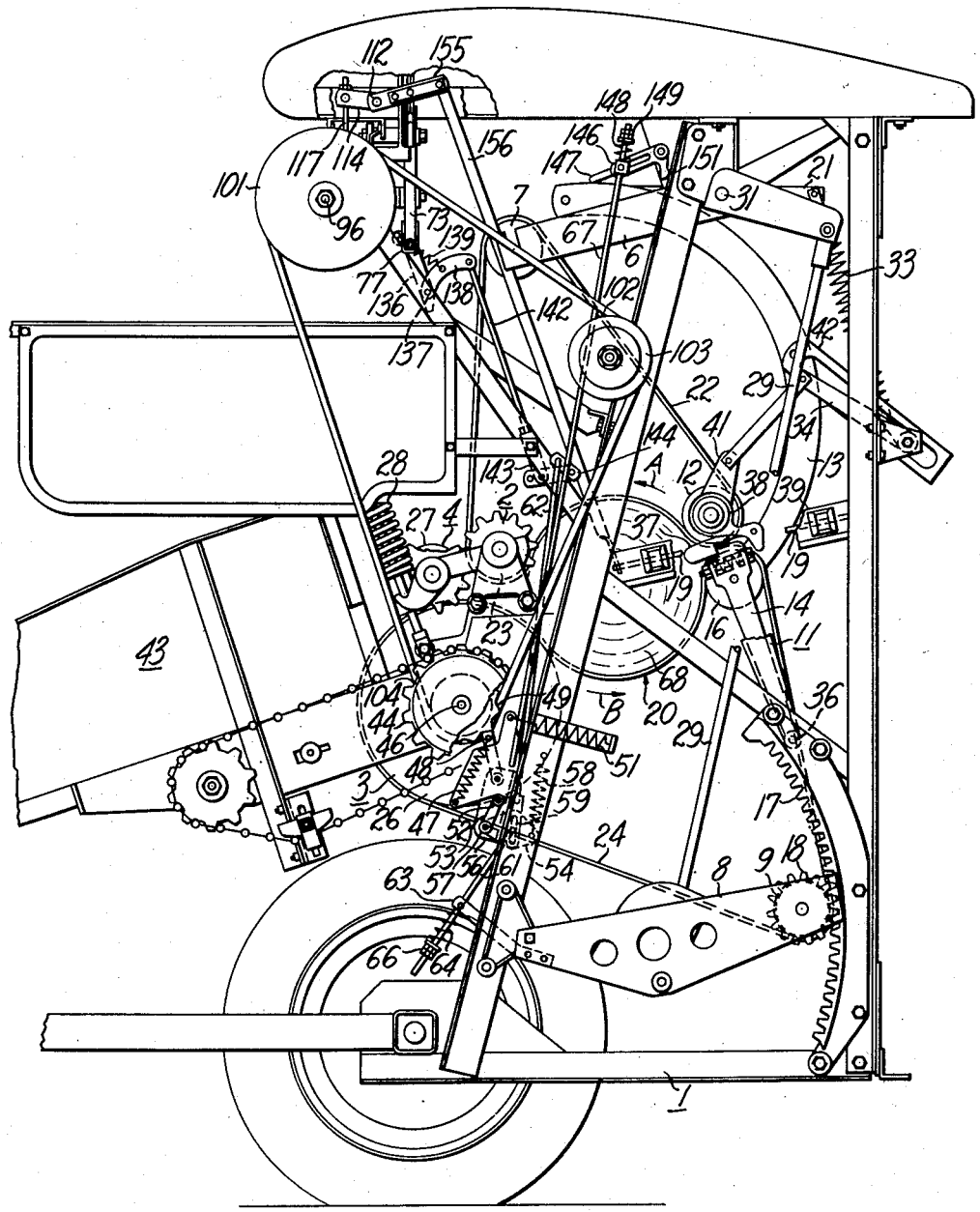
Fig. 1 is a partial left side elevation of a rotary baler embodying the invention with some parts broken away.

Referring to Fig. 1 it is seen that the invention may be applied to a wheel supported baling machine comprising a frame structure 1 operatively mounting an upper drive roll assembly 2, a lower drive roll assembly 3, a press roll assembly 4, an upper tension roll assembly including a pivotally supported tension arm 6 rotatably mounting a roll 7, a lower tension roll assembly including a pivotally supported tension arm 8 rotatably mounting a roll 9, an upper trip roll assembly including an arm 11 rotatably supporting a roll 12, a lower trip roll assembly including a hanger or bow member 13 supporting at its lower end an arm 14 which in turn rotatably mounts a roll 16, an arcuate rack 17 with which is engaged a pinion 18 carried by the adjacent end of lower tension arm 8, a pivoted latch release bar 19, and a discharge rocker arm 21 which is pivotally connected at one end to bow member 13.

A bale forming or rolling mechanism 20 includes one or more endless bale forming bands 22 which are mounted for movement over the roll portion 23 of drive assembly 2, over the roll 7 of the upper tension assembly, and over the roll 12 of the upper trip assembly and, one or more endless bale forming bands 24 which are mounted for movement over the roll portion 26 of drive assembly 3, over the roll 9 of the lower tension assembly, and over the roll 16 of the lower trip assembly. The bands 22 and 24 are driven in the same direction by the roll portions of the drive assemblies as shown by arrows A and B in Fig. 1, and the roll portion 27 of assembly 4 is preferably releasably held in engagement with the roll portion 26 of lower drive assembly 3 by means of one or more springs 28.

The upper and lower tension arms 6 and 8 are pivotally interconnected for simultaneous angular movement by means of a rod 29 and the upper tension arm 6 and discharge rocker arm 21 are mounted for relative angular movement about a common fulcrum 31, arm 6 being biased by a spring 32 (Fig. 2) for counterclockwise movement (as viewed in Fig. 2) about said fulcrum, and arm 21 (Fig. 1) being biased in clockwise direction by means of a spring 33 having one end connected with one arm of a bell crank lever 34 and having its other end connected with the adjacent end of arm 21. Trip roll arms 11 and 14 are pivotally interconnected at 36 for relative angular movement and are normally retained locked in the aligned position shown by means of a releasable latch 37 carried by arm 11 in a position to engage a portion of the arm 14. Arm 11 also has mounted thereon a flanged wheel 38 adapted to engage and roll along the top surface of an inclined frame member 39 which mounts the latch bar 19; arm 11 and wheel 38 being normally supported for coaction with frame member 39 by means of a link 41 connecting the upper end of arm 11 with an arm of bell crank lever 34. Movement of bow member 13 toward the lower drive roll assembly is limited by a looped link 42 connected as shown.

Material to be baled is delivered to a point adjacent the roll portions of press roll assembly 4 and lower drive roll assembly 3 by means of a feed mechanism in the form of a pickup conveyor 43 which is chain driven from a sprocket 44 operatively mounted on a normally rotating shaft 46 forming a part of the lower drive roll assembly 3; the relation between sprocket 44 and shaft 46 being such that when a pivotally mounted latch plate 47 is positioned with a pawl 48 thereon engaged with ratchet like surface 49, the sprocket 44 drives conveyer 43, and that when latch plate 47 is moved to a pawl disengaging position by the action of spring 51, the sprocket 44 becomes stationary. Latch plate 47 is normally retained positioned to engage pawl 48 with ratchet like surface 49 by means of a roller 52 carried by a crank arm 53; arm 53 and a plate 54 being integrally connected and pivotally mounted on a frame bracket 56 for angular movement about a common pivot 57. A spring 58 acts to retain arm 53 and plate 54 in the position shown in Fig. 1, and the plate is provided with an elongated opening 59 therethrough in which is positioned the upper turned over end of a downwardly extending link 61. An upwardly extending link 62 has its lower end pivotally connected with the adjacent lower end of link 61 for movement therewith. The lower end of link 61 is interconnected with a strap 63 on the adjacent end of lower tension arm 8 by means of an interposed spring 64, and spring positioning adjusting nuts 66. The position of spring 64 determines the extent lower tension arm 8 must move in a counterclockwise direction from its initial starting position in order to actuate crank arm 53 and effect the release of latch plate 47 which can be readily returned to its shown position with pawl 48 engaging ratchet like surface 49 by means of a link 67 having its lower end connected with plate 47.

The correlation of the various parts so far described is the same as that described in the mentioned Scranton et al. patent U. S. 2,468,641, and in Harrer patent U. S. 2,424,821 issued July 29, 1947, and reference may be had to these patents if a more complete description is desired. The parts so far described function as follows: material passing between the roll portions of the press roll assembly 4 and the lower drive roll assembly 3 is engaged by bale rotating mechanism 20 including the endless bale forming bands 22 and 24 and rolled into a compact formed cylindrical bale 68, and when the bale attains a desired diameter the conveyer 43 is stopped automatically and the latch release bar 19 is actuated to lift latch 37 on arm 11 whereupon the upper and lower trip roll assemblies move apart ejecting the bale rearward from between the bale forming bands 22 and 24 and out of the machine; the trip and tension assemblies automatically returning to their initial bale starting positions.

Figure 3:
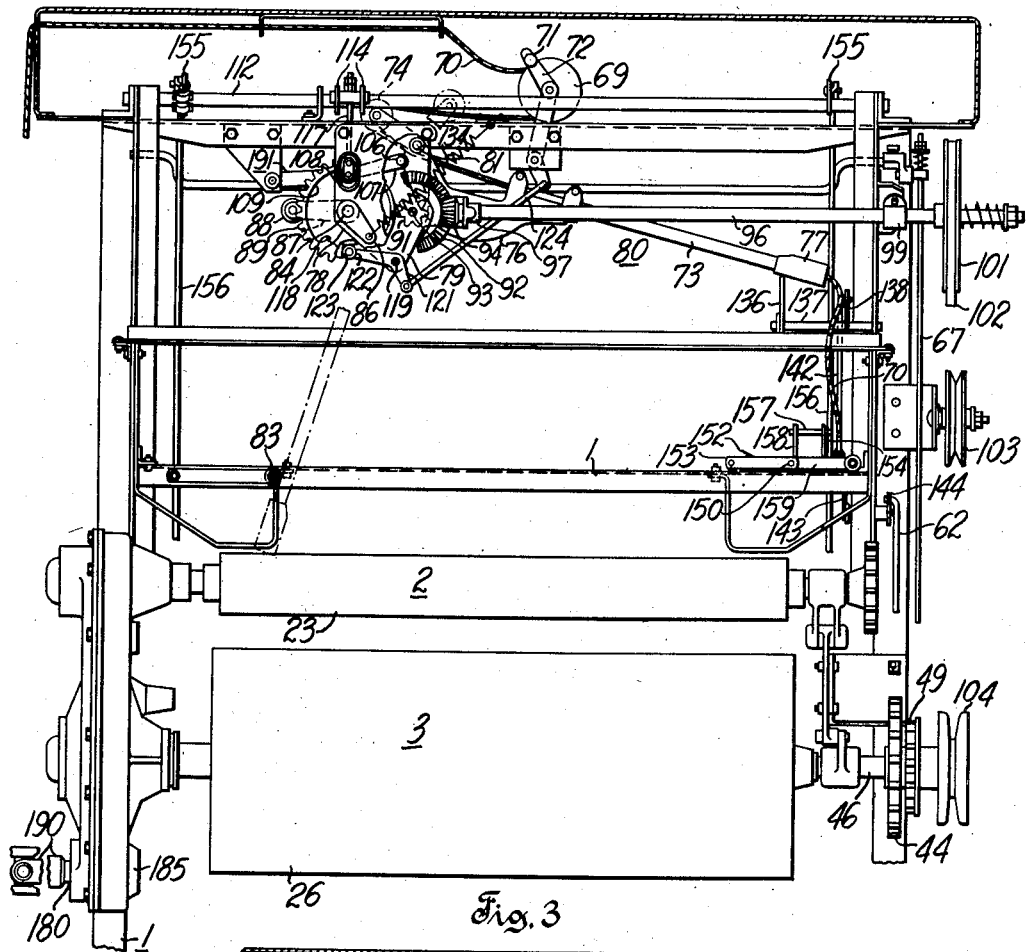
Fig. 3 is a partial front elevation of a twine mechanism incorporated in the baler shown in Figs. 1 and 2, with parts broken away.
Figure 4:
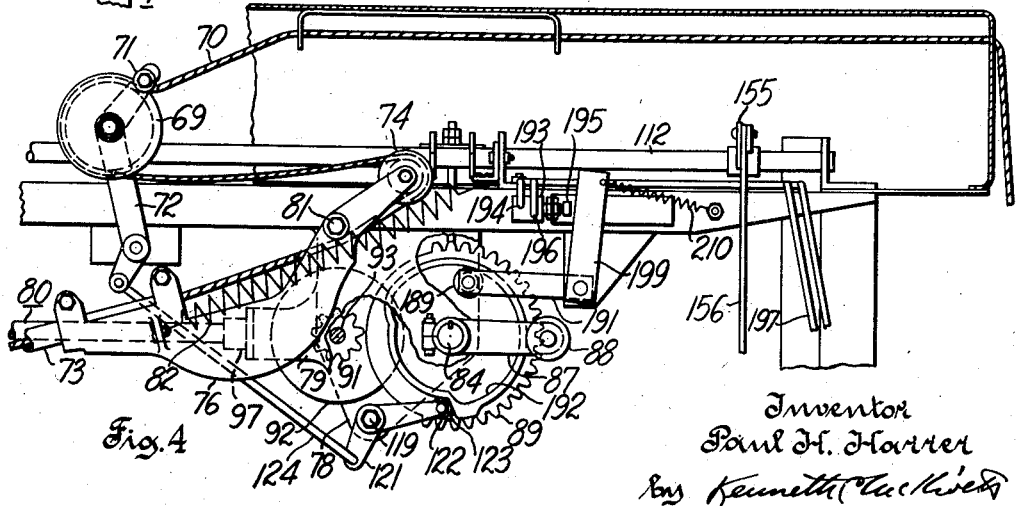
Fig. 4 is an enlarged rear elevation of a portion of the twine mechanism, with some parts removed.

Referring to Figs. 3 and 4, it is seen that the frame structure 1 also has mounted thereon a binding material dispensing mechanism which, in conformity with well known principles of operation, functions during a predetermined time interval after the attainment of a predetermined diameter of the formed bale, to effect wrapping of binding material spirally lengthwise around the bale. Briefly, the binding material dispensing mechanism comprises a pair of spring pressed twine tensioning disks 69 (only one of which is shown) and a twine roller 71 both mounted on one arm of a bell crank lever 72 in such relation that the twine roller 71 forces the twine 70 between the disks 69. A binding material engaging guide element in the form of a twine tube 73 has on its upper end a twine guide roller 74 for conducting the twine into the tube; an intermediate external cam edge portion 76; and at its lower end a twine feeding ferrule 77 through which the twine passes in leaving the tube. A housing is formed by spaced, rigidly connected and supported front and rear plates 78 and 79, respectively, operatively supporting the twine feed tube, and a cycling mechanism 80 which will be described more fully hereinbelow is provided for controllably positioning and positively moving the twine feed tube lengthwise of the bale with a substantially uniform horizontal velocity component during the bale wrapping operation.

The twine tube 73 is supported for angular movement by having its upper end pivotally mounted on a fixed pin 81 projecting laterally outward from rear plate 79 and is biased by gravity and by the action of a spring 82 to assume the dotted line position shown in Fig. 3; movement in the clockwise direction being limited by engagement with a fixed stop member 83 carried by a part of the frame structure 1. Plates 78 and 79 are provided with a pair of aligned bearings in which is rotatably mounted a shaft 84 having exposed front and rear end portions to which are secured crank arms 86 and 87, respectively, crank arm 87 having mounted on the distal end thereof a laterally projecting roller 88 adapted to engage the cam portion 76 of twine tube 73. A spur gear or movable timing element 89 having a nontoothed peripheral portion (hereinafter called a partial gear) is fixed on shaft 84 between the plates 78 and 79 in such a position as to be driven through a predetermined angle by a spur gear 91 integral with the hub portion of a bevel gear 92 rotatably mounted between plates 78 and 79 on a fixed shaft 93 which extends between and is supported by plates 78 and 79. Bevel gear 92 meshes with and is driven by a pinion 94 fixed on a rotary actuating element or shaft 96 which has its adjacent inner end rotatably mounted in a bearing 97 supported by an integral forwardly extending arm (not shown) on rear plate 79. The opposite end of shaft 96 is rotatably supported in a bearing 99 mounted on the frame structure 1 and carries at its outer end a V-belt pulley 101 which, as shown in Fig. 3, is driven by a belt 102 running over an idler pulley 103 mounted on the frame structure and over a drive pulley 104 fixed on shaft 46 of the lower drive roll assembly 3.

Front plate 78 has fixed thereon a rearwardly projecting fixed pin 106 on which is pivotally mounted a crank arm 107 carrying a laterally projecting roller 108 adapted to engage and ride on the inner peripheral surface 109 of the toothed flange portion of gear 89 as is best shown in Fig. 3; arm 107 being biased to maintain roller 108 in continuous engagement with surface 109 by means of a spring (not shown). A transverse shaft 112 is rotatably mounted in bearings carried by opposite side portions of the frame structure 1 and is provided with a laterally projecting arm 114 which is connected with roller carrying crank arm 107 by means of suitable linkage including link 117. Surface 109 is provided with an integral cam portion 118 and the movement of roller 108 thereover results in a counterclockwise movement of crank arm 107 as viewed in Fig. 3, and in a consequent anticlockwise rocking movement of shaft 112 as viewed in Fig. 1.

Plates 78 and 79 also have secured therebetween a fixed shaft 119 (Fig. 3) on which is pivotally mounted a bell crank lever 121 having on one arm thereof a roller 122 adapted to engage a stop projection 123 integral with the rear side of gear 89 and having its other arm connected for simultaneous movement with the downwardly extending arm of the bell crank 72 by means of a link 124; the bell cranks 72 and 121 both being normally retained in the positions shown by means of a spring 126 (see Fig. 8).

The unit comprising shaft 84, crank arm 86, crank arm 87, roller 88 and gear 89 is normally retained in the position shown in Fig. 3 by means of a spring 134 (Fig. 2) having one end fastened to a fixed part of the frame structure 1 and having its other end fastened to the outer end portion of crank arm 86. The arrangement of parts as shown in Fig. 3 is such that spring 134 tends to rotate shaft 84, partial gear 89 and crank arms 86 and 87 in a counterclockwise direction as viewed in Fig. 3, but such movement is obstructed by the roller 122 on bell crank lever 121 while said roller is in engagement with the stop projection 123 on partial gear 89. In the condition of the mechanism as shown in Fig. 3, the toothed portion of partial gear 89 is angularly spaced out of meshed relation with respect to the teeth on drive gear 91 and therefore gear 91 is inoperative to drive partial gear 89 counterclockwise. Upon release of roller 122 from stop projection 123, gear 89 is rotated counterclockwise by spring 134 a sufficient distance to engage the first tooth thereon with the constantly rotating gear 91. The twine tube 73 is retained in its raised position by means of a latch 136 fixed on a rod 137 pivotally mounted on the frame structure 1 and biased to the position shown in Fig. 3 by means of an arm 138 (Fig. 1) fixed on rod 137 and by a spring 139 connected with arm 138 and with a fixed part of the frame structure.

Referring again to Fig. 1, it is seen that arm 138 on rod 137 is interconnected with link 62 by means of link 142, its extension 143 and a bell crank lever 144 having one arm connected with the lower end of extension 143 and having its other arm connected with the upper end of link 62.

Conveyer drive latch plate 47 has its upper end connected with an arm 146 fixed on the adjacent end of a pivotally mounted, transversely extending crank bar or rod 147 by means of an interposed spring 148 and spring positioning adjusting nuts 149. Movement of crank rod 147 in a counterclockwise direction and thereby the movement of link 67 and latch plate 47 in a pawl disengaging direction is limited by the engagement of a stop projection 151 on arm 146 with the adjacent frame structure. Crank rod 147 is positioned to be engaged by the upper end of bow member 13 as the lower trip roll assembly 14, 16 is returned toward and nears its initial bale starting position, and the position of spring 148 determines the extent the rod 147 must be moved clockwise from the position shown in order to actuate link 67 and reposition latch plate 47 and pawl 48 as indicated in Fig. 1. In this connection, the spring 148 is preferably so adjusted that latch plate 47 and pawl 48 are repositioned to start conveyer 43 just as soon as the trip roll assemblies return to their initial bale starting positions.

Referring once again to Fig. 3 it is seen that the frame structure also mounts a fixed twine cutting knife 152 positioned to be engaged by the twine fed from the distal end of tube 73 as it approaches its full line position, and a knife guard 153 is attached to a pin 150 pivotally carried by frame structure 1 and guard 153 is normally positioned to prevent the twine for contacting the knife. Shaft 112 is also provided with a pair of arms 155 one of which is operatively connected by means of a link 156 (Fig. 1) with the latch release bar 19. There is a part (not shown) on link 156 which is connected to a crescent shaped member 154 which in turn is attached as by welding to a shaft 157 journaled in bracket 158. Member 154 engages arm 159 which is also attached to pivot pin 150, thereby preventing movement of pivot pin 150 and twine guard 153 attached thereto. The arrangement is such that a counterclockwise movement of shaft 112, as viewed in Fig. 1, raises link 156 which in turn moves crescent shaped member 154 out of contact with arm 159. The pull of twine 70 together with the downward movement thereof causes guard 153 to pivotally swing downwardly thereby exposing the twine to severing action by knife 152. This upward movement of link 156, previously mentioned, also actuates trip bar 19 to release latch 37 which normally retains the trip roll assembly arms 11 and 14 in alignment.

Figure 2:
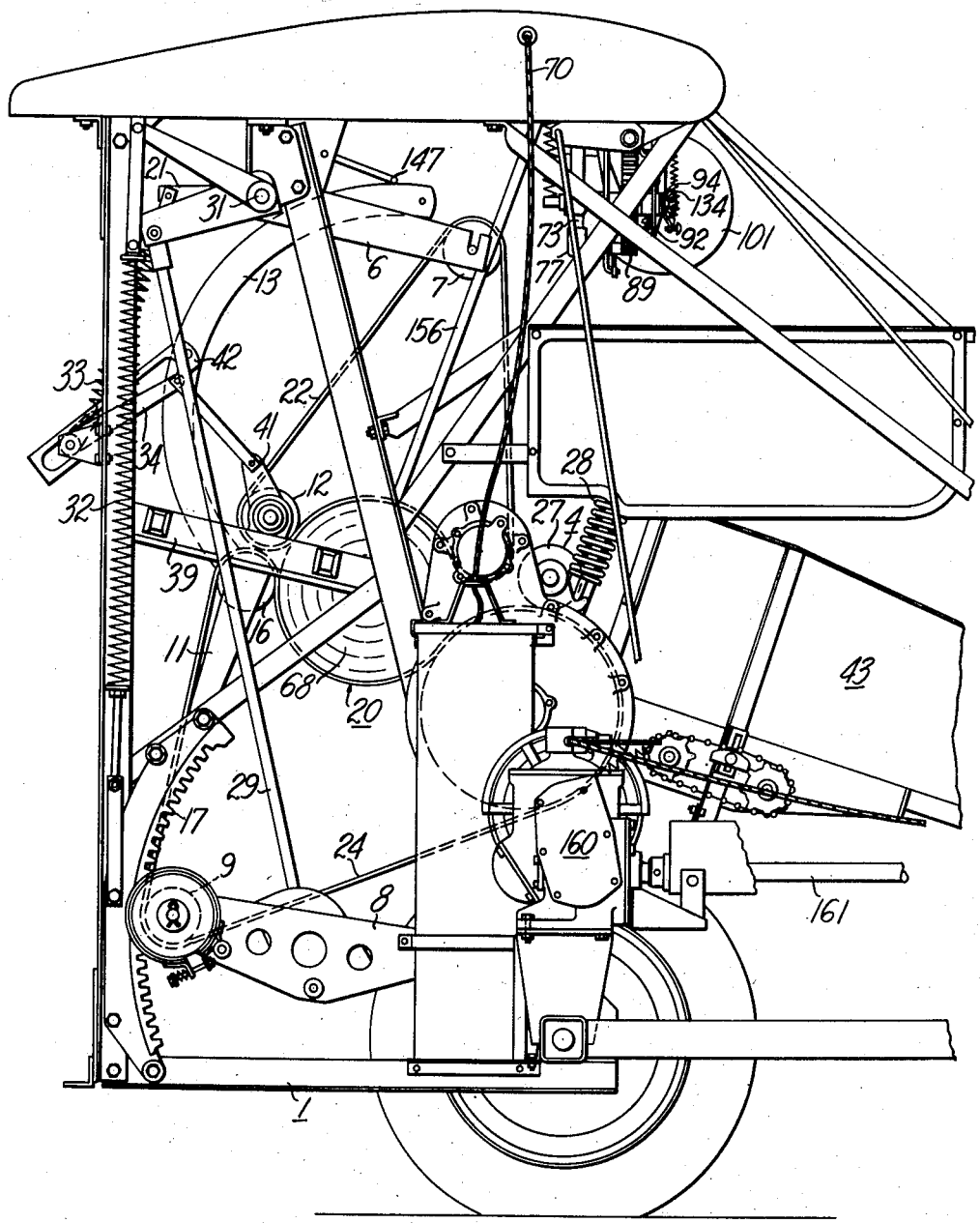
Fig. 2 is a partial right hand side elevation of the rotary baler shown in Fig. 1, with parts broken away.
Figure 6:
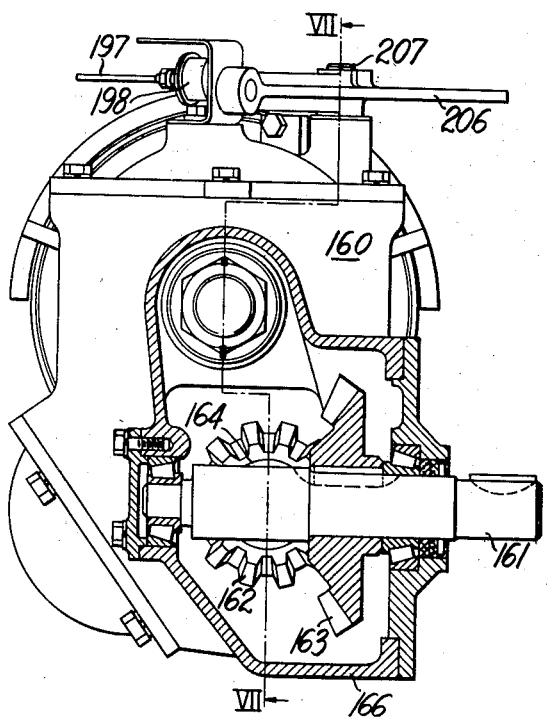
Fig. 6 is a section view taken on line VI—VI of Fig. 7.

Referring to Fig. 2, the various baler mechanisms are driven by a power input shaft 161 connectable with the power take-off of a tractor (not shown) or other source of power. A change speed transmission 160 includes a bevel gear 162 (Fig. 6) which is driven by a bevel gear 163 keyed to power input shaft 161 for rotation therewith. Bevel gear 162 is keyed to shaft 164 which is rotatably mounted in gear housing 166 (Fig. 7) and a gear 167 is splined to shaft 164 for rotation therewith. A gear 168 which is rotatably mounted about shaft 164 is driven by gear 167 through a one way or overrunning spring clutch means 169 which is so made that it will transmit rotation from gear 167 to gear 168 in the direction in which shaft 164 is driven, and so that gear 168 may overrun shaft 164 in that direction when it is driven at a higher speed, as will be presently described. A gear 171 is splined to a variable speed power output shaft 172 and meshes with gear 168. Gear 171 may be shifted longitudinally on shaft 172 to mesh with idler gear 173 which in turn meshes with and is driven by gear 174 which is integral with shaft 164. Another gear 176 rotatably mounted on shaft 172 meshes with and is driven by gear 167 and an electric clutch rotor 177 with integral clutch facing 178 is attached to and rotates with gear 176. Hub 179 having an integral flange 181 is splined to and rotates with shaft 172, and an armature hub or movable control element 182 is splined to and rotates with hub 179. Clutch armature 183 is suitably attached to hub 182. A clutch magnet winding 186 is rigidly connected to upper portion 187 of gear housing 166 by means of screws 188. Flange 181 is drivingly connected to rotary drive element or shaft 180 (Fig. 3) of gear box 185 by means of a universal joint 190. Shaft 180 is connected through suitable gearing (not shown) contained in gear box 185, with rolls 23 and 26 of upper and lower drive roll assemblies 2 and 3, respectively, so as to drive these rolls in the same directions.

Figure 5:
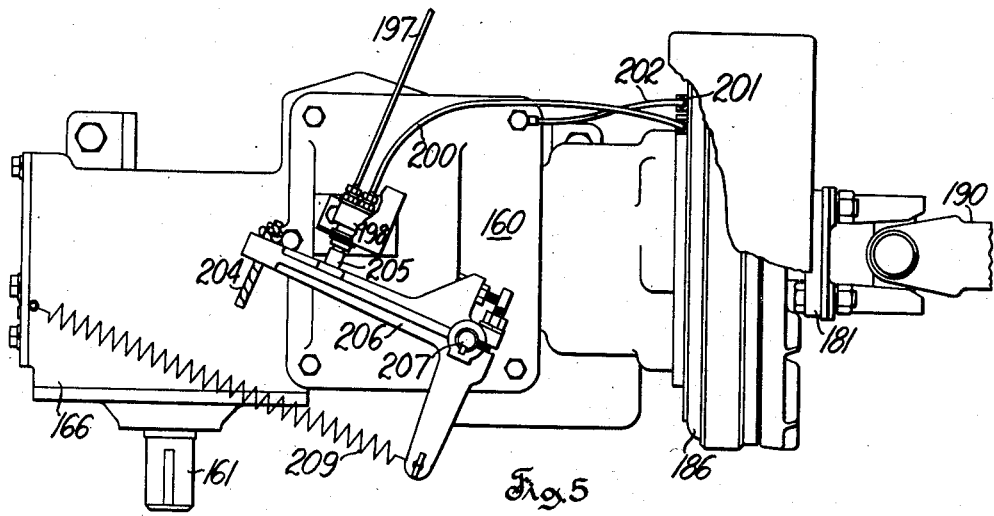
Fig. 5 is an enlarged plan view of the baler gear box and connected portions.

Referring to Fig. 4, a roller 189 is rotatably mounted on an arm of crank 191 which is trunnioned on a bracket of frame 1 and biased by spring 210 so as to urge roller 189 radially against an internal cam surface 192 on partial gear 89. When the twine 70 is caught and starts to wrap about the bale, tension of twine 70 causes roller 122 to swing away from stop 123. As a result, gear 89 is rotated clockwise as viewed in Fig. 4, by the action of spring 134 (Fig. 3) so that the raised portion of cam surface 192 contacts the roller 189 and moves the other crank arm 199 of bell crank 191 to actuate electric switch button 195. An electric switch 193 carried by frame 1 has one terminal 194 wired to the battery on the tractor draft means (not shown) and the other terminal 196 is connected by wire 197 to switch 198 (Fig. 5) carried on gear housing 166. Switch 198 is connected to the clutch magnet winding 186 by lead 200. The other end 201 of magnet winding 186 is grounded to case 166 by lead 202. Switch 193 (Fig. 4) is so positioned on baler frame 1 that arm 199 (Fig. 4) of bell crank 191 contacts the switch button 195 when the high point of cam 192 passes roller 189 thereby closing the electrical circuit and initiating a flow of electrical energy to the clutch magnet winding 186. The flow of electrical current in magnet winding 186 (Fig. 7) sets up a magnetic field in rotor 177 which attracts armature 183 and establishes a driving connection therewith. Shaft 172 is now driven by gear 167, meshed with gear 176, at a substantially higher speed than that at which it is normally driven through gears 168, 171 and spring clutch 169. Upon establishment of the high speed drive, clutch 169 permits gear 168 to overrun gear 167. Establishment of the high speed drive results in higher speeds of rotation of all elements in the baler, and the high speed operation continues until the twine is severed. When this occurs the mechanism automatically returns to the condition in which it is shown in Fig. 4, and in which condition the electrical circuit to magnet winding 186 is broken by crank arm 199 (Fig. 4) having moved away from the actuating button 195. As a result, the electro-magnetic flux through rotor 177 (Fig. 7) disappears, the pull on armature 183 is relaxed, and the drive from gear 167 through clutch 169 to gears 168 and 171 is automatically restored by operation of the clutch 169.

The longitudinal shifting of gear 171 previously mentioned is utilized for driving the baler mechanisms in reverse, as when clearing a plugged machine. This is accomplished by pulling on a rope 204 (Fig. 5) running from the operator's seat on the tractor (not shown) to lever 206 which is keyed to a vertical shaft extension 207 (Fig. 7) of shifter finger 208 which engages a groove in a hub of gear 171 for imparting longitudinal motion thereto. This shifting of gear 171 is only done when shafts 164 and 172 are not rotating. When gear 171 is in mesh with gear 173 the direction of rotation of shaft 172 is reversed. In order to preclude the possibility of having the overdrive mechanism from gear 167 to gear 176 through the electric clutch mechanism engaged at the same time with this reversing mechanism, lever 206 is moved out of contact with the actuating button 205 on switch 198 (Fig. 5) by the pull described above and thereby opening the electrical circuit to magnet winding 186. A spring 209 is attached to lever 206 to normally retain lever 206 in contact with button 205.

Assuming that the machine is normally operating with the various parts positioned as shown in Fig. 1, that is, with conveyer 43 delivering material to the machine and the material passing between the roll portions of the press and drive roll assemblies and then around the partially formed bale 68 disposed therein, it is apparent that the upper and lower tension rolls 7 and 9, respectively, are moving toward each other, that the upper and lower tension arms 6 and 8, respectively, are both moving in a counterclockwise direction about their points of pivotal support, that the upper and lower trip roll assemblies are moving rearward with the flanged wheel 38 in engagement with frame member 39 and that the parts will continue to move as just described until the projection 63 on lower tension arm 8 actuates link 61 so as to turn crank arm 53 and plate 54 a sufficient distance in a clockwise direction to first release twine tube latch 136 thereby permitting twine tube 73 to swing downward to the dotted line position shown in Fig. 3 and to then release latch plate 47 (Fig. 1) which is immediately moved to its pawl disengaging position by the action of spring 51.

The dropping of twine tube 73 places the twine 70 hanging from the distal end thereof on the material about to pass between the roll portions of the press and drive roll assemblies and the material carries the twine between said roll portions and around the formed bale. The conveyer 43 is still operating when the twine tube is dropped and continues to operate until the latch plate 47 is released as just described whereupon operation of the conveyer immediately ceases. The pull exerted on the twine in passing between the roll portions of the press and drive roll assemblies moves the twine tension disk carrying bell crank 72 (Fig. 3), and the bell crank 121 which is connected to bell crank 72 by means of link 124, in a counterclockwise direction. The counterclockwise movement of bell crank 121 withdraws roller 122 from engagement with stop projection 123 on gear 89 and the spring 134 connected with arm 86 on shaft 84 quickly rotates shaft 84 and thereby arm 86 and gear 89 until the first tooth on gear 89 engages the continuously rotating spur gear 91. When gear 89 is driven by gear 91 the high portion of cam 192 forces 189 (Fig. 4) downwardly. As a result, bell crank arm 199 is moved into contact with and actuates button 195 so as to close switch 193, thereby energizing magnet winding 186 of the clutch. This establishes a driving connection from gear 167 through gear 176 (Fig. 7) to shaft 172, which causes shaft 172 to rotate at a greatly increased rate of speed. Roller 88 (Fig. 3) on arm 87 moves in proximate relation to the cam surface 76 on twine tube 73 and the rotation of gear 91 drives gear 89 and thereby shaft 84 and arms 86 and 87 counterclockwise.

During the initial rotation of gear 89 by gear 91, twine tube 73 remains stationary in its dotted line position until roller 88 on arm 87 engages cam surface 76 and this delayed action permits one or more turns of twine to be wrapped around the adjacent end of the formed cylindrical bale before the twine tube commences to move lengthwise thereof. The high portion of cam surface 192 is so positioned that switch 193 is closed when roller 88 engages cam surface 76. The engagement of roller 88 with cam surface 76 moves tube 73 in a counterclockwise direction toward its full line position; the cam surface 76 being so shaped that the end of the tube travels lengthwise of the bale as the tube moves from its dotted line position to its full line position, and that when the tube reaches its full line position, it is held in such position until the latch 136 is repositioned to hold the tube in its raised position as shown.

In general, the correlation of parts is such that the tube 73 reaches its raised position just before the cam portion 118 on the inner peripheral surface of gear 89 engages roller 108 on crank arm 107 and moves said arm downward in a counterclockwise direction as viewed in Fig. 3, and that the tube 73 is held in its raised position by the roller 88 on crank arm 87 until the cam portion 118 moves away from the roller 108 on arm 107. The counterclockwise movement of arm 107 is transmitted through link 117 to shaft 112 which turns in a counterclockwise direction as viewed in Fig. 1, and through the medium of arm 155 and link 156 moves the guard 153 away from the knife 152 and actuates bar 19 to release latch 37 carried by arm 11 of the upper trip roll assembly. As a result, the twine snaps against and is cut by knife 152, the arms and rolls 11, 14 and 12, 16, respectively, of the trip roll assemblies move apart and discharge the bale from the machine, and the tension rolls 7 and 9 carried by arms 6 and 8, respectively, move away from each other to their initial bale starting positions; such movements of the tension and trip roll assemblies occurring substantially simultaneously.

Figure 7:
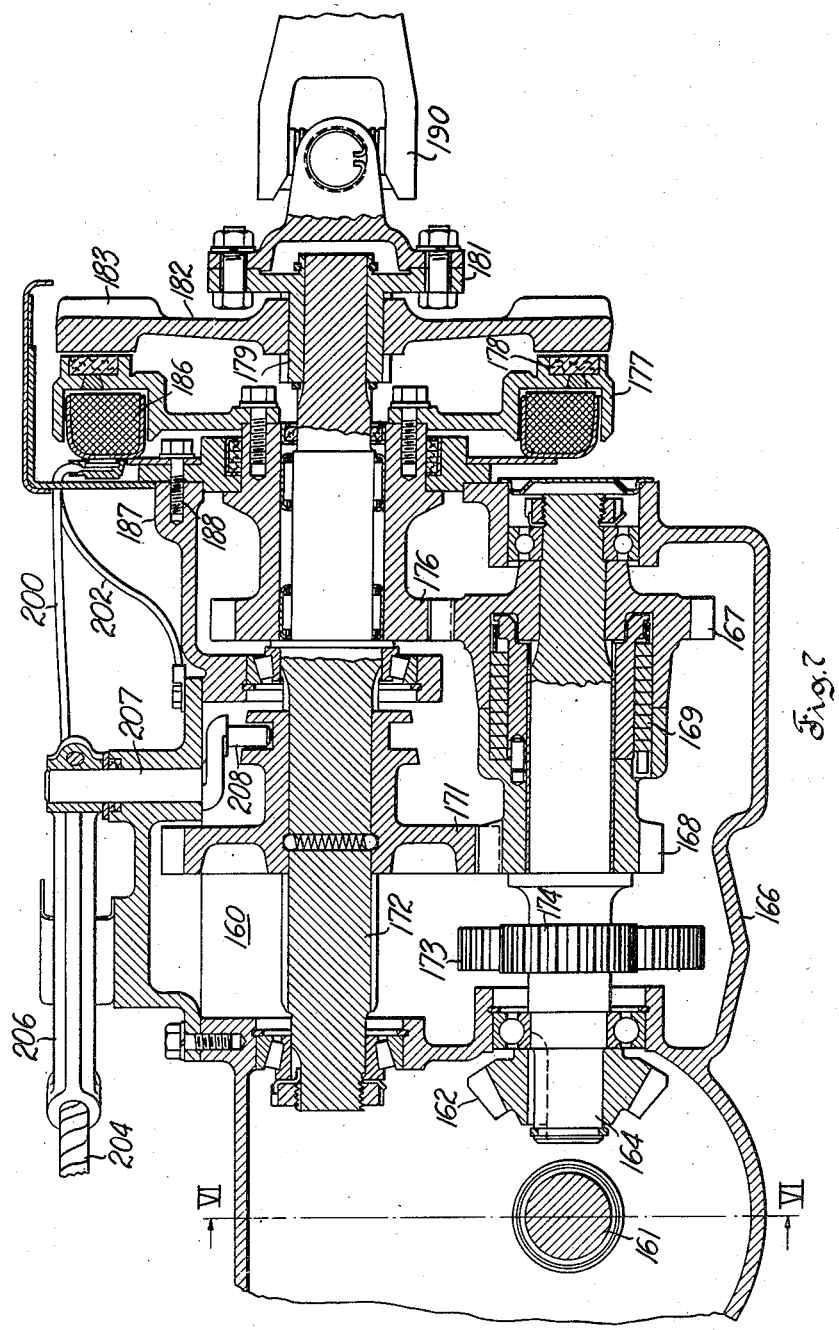
Fig. 7 is an enlarged section view taken on line VII—VII of Fig. 6.

The cutting of the twine releases the pull on twine tension disk bell crank 72 which is immediately returned to its normal position shown in Fig. 3 by a spring 126 (Fig. 8) thereby repositioning roller 122 on bell crank 121 to be engaged by the stop projection on gear 89. Cam surface 192 is also so configured that switch 193 is opened, when the twine is cut, by spring 210 (Fig. 4) which moves bell crank 191 out of contact with switch button 195, thereby breaking the electrical circuit of clutch magnet winding 186 (Fig. 7). As a result, shaft 172 is driven through gears 168 and 171 at a slower rate of speed, and the bale mechanisms which are driven by shaft 172, are operated at a correspondingly reduced rate of speed. The return of lower tension arm 8 (Fig. 1) to its initial bale starting position releases the pull on link 61 and as a result links 61, 62, 142 and 143 are immediately moved upward by the action of spring 139. During this phase of the cycle latch plate 47 is held by spring 51 in the position determined by the engagement of stop projection 151 on arm 146 with the adjacent frame structure (note the upper end of link 67). This movement of links 61, 62, 142 and 143, which is sufficient to reposition latch 136 beneath twine tube 73 as shown in Figs. 1 and 3, takes place during the time interval the tube is held in its fully raised position by roller 88 on arm 87, that is, during the time cam portion 118 on gear 89 is in engagement with the roller 108 on arm 107. In this connection, it should be noted that the twine tube is held substantially stationary for a short time interval before shaft 112 is actuated by crank arm 114 to effect the removal of twine guard 153 and the release of latch 37 which permits one or more turns of twine to be wrapped around this end of the bale before the twine is cut and the bale discharged from the machine. Shortly after the cam portion 118 is disengaged from the roller 108 on arm 107, the gear 89 moves out of mesh with drive gear 91 at which time arm 86 moves over the center with respect to spring 134 whereupon spring 134 rapidly rotates gear 89 and the parts movable therewith into the positions shown in Figs. 3 and 4.

Upon discharge of the bale from the machine, the upper and lower trip roll assemblies immediately return to their initial bale starting positions with the arms 11 and 14 locked in alignment by means of latch 37 on arm 11 and this rapid movement of the trip roll assemblies actuate crank rod 147 and thereby link 67 which repositions latch plate 47 and pawl 48 to start the conveyor and again deliver material to the press and drive roll assemblies just as soon as the various bale forming parts are positioned to receive the material.

From the foregoing, it has been shown how an overdrive mechanism can be applied to a baling machine so that operation of the twine wrapping cycle can be automatically speeded up to thereby increase the capacity of the baler to produce bales.

Referring to Figs. 8, 9 and 10, another embodiment of this invention is shown. In this embodiment a mechanical linkage actuates the change speed transmission and a different type of overdrive mechanism is utilized.

Referring to Fig. 10, pinion 211 is driven by a bevel gear (not shown) keyed to power input shaft 213 for rotation therewith. Shaft 213 is driven by conventional means such as a tractor power take-off shaft. Bevel pinion 211 is splined to a shaft 214 which is rotatably mounted in gear housing 216 and a gear 217 is also splined to shaft 214 for rotation therewith. A gear 218 rotatably mounted on shaft 214 is driven by gear 217 through a one way or overrunning spring clutch means 219 which is so made that it will transmit rotation from gear 217 to gear 218 in the direction in which shaft 214 is driven and so that gear 218 may overrun shaft 214 in that direction when it is driven at a higher speed as will be presently described. A gear 221, which is splined to shaft 222, meshes with gear 218. Gear 221 may be shifted longitudinally on shaft 222 to mesh with idler gear 223 which in turn meshes with and is driven by gear 224 which is integral with shaft 214. Another gear 226 rotatably mounted on shaft 222 meshes with and is driven by gear 217 and a spring clutch means 227 is locked to and rotates with gear 226. Hub 228, whose outside diameter is slightly less than the inside diameter of spring 227, is keyed to and rotates with shaft 222. An actuator sleeve 231 is constrained to rotate with hub 228 by pin 230 which engages a slot in hub 228. Sleeve 231 has an angular portion 232 which is normally laterally spaced from an angular portion 233 of spring 227 by spring 234 which is actuable by a movable control element or actuator button 236 which is connected to sleeve 228 by pin 230.

Actuator button 236 is engaged by a lever 237 pinned to shaft 238 which is journaled in gear housing 216 for oscillation. In Fig. 8, crank 239 is pinned to shaft 238 on the outside of gear housing 216 and is in turn connected to crank 241 by a link 242. Link 242 has a rod portion 243 which is adjustably mounted in an end portion 244 connected to crank 239. A spring 246 is interposed between rod portion 243 and end portion 244 to provide a substantially constant predetermined pull on crank 239 when link 242 is moved upward.

Referring to Figs. 8 and 10 it is seen that the actuator lever 239 is connected to the twine tension crank 72 by link 242, crank 241, link 247 and link 248. A crank 251 has its upper end connected to links 247 and 248 and on its lower end is provided with a roller 249. This roller 249 is adapted to contact a radial cam surface 252 on partial gear 89 limiting the motion of the above linkage, when the twine tube 73 has dropped and twine is commencing to wrap about a bale, to an amount sufficient to permit disengagement of roller 122 from lug 123 on gear 89 but insufficient to cause sleeve 231 to engage clutch spring 233 (Fig. 10). As soon as the cam surface 252 passes roller 249, roller 249 and its connected linkage moves sufficiently to force sleeve 231 into engagement with spring 233 and the frictional drag thereon causes the spring 233 to wrap down and engage hub 228 thereby locking it to gear 226. Shaft 222 is now driven by gear 217 through gear 226 at a substantially higher speed than its normal speed when driven by gear 218 through gear 21, and spring clutch 219 overruns in its pocket in gear 217. This produces higher speeds of rotation of all elements in the baler until the twine is severed, whereupon the pull is released on crank 72, and thereupon lever 237 (Fig. 10), crank 239 (Fig. 8), link 242, crank 241, link 247, crank 251, link 248 and crank 72 are returned to the positions shown in Figs. 8 and 10 by the action of a spring 126. Spring 234 (Fig. 10) forces sleeve 231 out of engagement with spring 233 and the drive of shaft 222 through gears 218 and 221 is restored.

Shaft 222 is coupled to shaft 180 (Fig. 8) of a gear train for driving the various elements of the baling machine, including upper drive roll 2 and lower press roll 3. A shock absorbing means 258 is interposed between halves 255 and 257 of a universal joint and which halves are connected to shaft 222 and shaft 180, respectively. Shock absorbing means 258 yieldably connects center yokes 259 and 260 by having a pair of abutting disk members 261 and 262 attached to yokes 259 and 260, respectively, with disk members 261 and 262 being provided with a plurality of springs 263 forming a connection between the disks to reduce the shock induced by acceleration forces set up by the overdrive unit. Center yokes 259 and 260 are connected to halves 255 and 257, respectively.

The longitudinal shifting of gear 221 is accomplished by pulling on rope 264 (Fig. 10) running from the operator's seat (not shown) to lever 266 which is keyed to a shaft extension 267 of shifter finger 268 which engages a groove in the hub of gear 221 for imparting longitudinal motion thereto. When gear 221 is in mesh with gear 223 the direction of rotation of shaft 222 is reversed and in order to preclude the possibility of having the overdrive from gear 217 to gear 226 through spring 233 to hub 228 engaged at the same time, lever 266 is connected to crank 239 by a chain 269 (Fig. 9) and when rope 264 is pulled, lever 239, shaft 238 and lever 237 are moved by the chain clockwise (Figs. 8 and 10) so that spring 234 forces sleeve 231 out of engagement with spring 233.

From the foregoing, it is seen how applicant's inventive concept may be embodied in a new arrangement of mechanisms to provide a speed up of the twine wrapping cycle of a rotary baling machine without increasing the amount of input power to any appreciable extent.

In general terms, the herein disclosed baling machine is provided with control means which are operable by the binding material dispensing mechanism and operatively connected with the change speed transmission mechanism so as to establish a high speed driving ratio between the transmission input and output shafts during the wrapping of binding material around the bale, and so as to establish a low speed driving ratio between the transmission input and output shafts upon the completion of the wrapping operation. In the embodiment of the invention illustrated by Figs. 1 to 7 the just mentioned transmission control means include the back and forth movable bell crank 191, and in the embodiment illustrated by Figs. 7 to 10, the control means include the back and forth movable bell crank 241.

The pickup conveyor 43 represents a feed mechanism which is operable by the output shaft of the change speed transmission to feed the bale material, such as hay, to the bale forming mechanism, and a cycling mechanism for rendering said feed mechanism and the binding material dispensing mechanism intermittently operative in alternate succession includes the latch plate 47 and associated parts, and the timing gear 89 and associated parts.

More specifically, the latch plate 47 and associated parts including the pawl 48 and ratchet wheel 49 represent first selectively engageable and disengageable power transmitting means which are operatively interposed between the power output shaft of the change speed transmission and the feed mechanism 43. The timing gear 89 and associated parts including the arm 87 and gear 91 represent second selectively engageable and disengageable power transmitting means which are operatively interposed between the transmission output shaft and the binding material engaging guide element or twine tube 73.

Control means for the mentioned first and second power transmitting means include the crank arm 53 and bell crank lever 121, and are adjustable to one operating condition, namely, the one shown in Figs. 1 and 4, which is effective to engage the first and to disengage the second power transmitting means. Alternately, as explained hereinbefore, the control means for the mentioned first and second power transmitting means are adjustable to a second operating condition, namely, the one in which the crank arm 53 is withdrawn from plate 47, and the bell crank lever 121 is withdrawn from timing gear 89, which second operating condition is effective to disengage the first and to engage the second power transmitting means.

In the embodiment of the invention illustrated in Figs. 1 to 7, the adjusting means for the change speed transmission, including the bell crank 191, are operatively connected with the second of said power transmitting means so that the change speed transmission will be in a low speed driving condition during the transmission of power to the feed mechanism and so that said transmission will be in a high speed driving condition during the transmission of power to the twine guide element.

In the embodiment of the invention illustrated by Figs. 8 to 10, the adjusting means for the change speed transmission, including the bell crank lever 241, is operatively connected with the control means for the second power transmitting means through a linkage including link 248.

It should be understood that it is not intended to limit the invention to the herein disclosed forms and details of construction, and that the invention includes such other forms and modifications as are embraced by the scope of the appended claims.

It is claimed and desired to secure by Letters Patent:

1. In a machine for rolling and twine wrapping a bale of fibrous material, the combination of a bale rolling mechanism, a change speed transmission having an input shaft adapted for connection with a power source and a variable speed output shaft connected in driving relation with said bale rolling mechanism, a rotatable gear element connected in driven relation with said variable speed output shaft, a twine dispensing mechanism cooperable with said bale rolling mechanism during a predetermined time interval upon attainment of a predetermined diameter of the formed bale to effect wrapping of twine spirally lengthwise around said bale, said twine dispensing mechanism including a partial gear rotatable into and out of mesh with said gear element at the beginning and upon the completion, respectively, of said wrapping operation; a movable control element operatively associated with said partial gear for back and forth movement in response to rotation of the latter; and means operatively interposed between said control element and said change speed transmission so as to establish a high speed driving connection from said input shaft to said bale rolling mechanism and to said gear element upon said movement of said partial gear into mesh with said gear element, and so as to establish a low speed driving connection from said input shaft to said bale rolling mechanism and gear element upon said completion of said wrapping operation.

2. A machine as set forth in claim 1, and comprising a cam element connected with said partial gear for rotation in unison therewith, and a cam follower connected with said control element in cooperative relation with said cam element.

3. A machine as set forth in claim 1, and comprising selectively engageable and disengageable clutch operatively associated with said change speed transmission for adjusting the latter to high and low speed driving conditions by engagement and disengagement, respectively, of said clutch; and actuating means operatively associated with said clutch and with said control element for effecting engagement and disengagement, respectively, of said clutch by movement of said control element in opposite directions.

4. A machine as set forth in claim 1, and comprising an electromagnetic clutch operable to selectively adjust said change speed transmission to either a high speed or a low speed driving condition, and an electric circuit including a switch operatively associated with said control element so as to be opened and closed by back and forth movement of the latter.

5. A machine as set forth in claim 1, and comprising a selectively engageable and disengageable clutch operatively associated with said change speed transmission for adjusting the latter to high and low speed driving conditions by engagement and disengagement, respectively, of said clutch, and an actuating linkage operatively interposed between said control element and said clutch.

6. In a baling machine, the combination of a baling mechanism for rolling material into a formed cylindrical bale; driving means including a power shaft for connection in driven relation to a power source, a variable speed output shaft drivingly connected with said baling mechanism, and change speed gearing operatively interposed between said shafts; a binding material dispensing mechanism operable by said output shaft during a predetermined time interval upon the attainment of a predetermined diameter of the formed bale to effect wrapping of binding material around said bale; and control means operable by said dispensing mechanism and operatively connected with said change speed gearing so as to establish a high speed driving ratio between said power shaft and said output shaft during said wrapping of binding material around said bale, and so as to establish a low speed driving ratio between said power shaft and said output shaft upon completion of said wrapping.

7. In a baling machine, the combination of a baling mechanism for rolling material into a formed cylindrical bale; driving means including a power shaft for connection in driven relation to a power source, a variable speed output shaft drivingly connected with said baling mechanism, and change speed gearing operatively interposed between said shafts; a binding material dispensing mechanism including a movable, binding material engaging guide element and actuating means for said guide element operable by said output shaft during a predetermined time interval upon the attainment of a predetermined diameter of the formed bale to effect wrapping of binding material spirally lengthwise around said bale; and control means operable by said actuating means and operatively connected with said change speed gearing so as to establish a high speed driving ratio between said power shaft and said driven shaft during said wrapping of binding material about said bale, and so as to establish a low speed driving ratio between said power shaft and said driven shaft upon completion of said wrapping.

8. In a baling machine, the combination of a baling mechanism for rolling material into a formed cylindrical bale; driving means including a normally constant speed power shaft, a driven shaft operatively connected with said baling mechanism, and change speed gearing operatively connecting said power shaft and said driven shaft for driving said driven shaft selectively either at a low or a high rate of speed; a binding material dispensing mechanism including a rotatable timing element driven by said output shaft during a predetermined time interval upon the attainment of a predetermined diameter of the formed bale, for effecting a wrapping of binding material spirally lengthwise around said bale; means controlled by said timing element to effect cutting of said binding material at the end of said wrapping operation; a back and forth movable control element in cooperative relation with said timing element so that said control element will be moved in one direction upon the start of rotation of said timing element, and so that said control element will be moved in the other direction after the cutting of said binding material; and means including said control element for adjusting said change speed gearing so that the speed of said driven shaft will be changed from said low rate to said high rate in response to said movement of said control element in said one direction, and so that the speed of said driven shaft will be changed from said high rate to said low rate in response to said movement of said control element in said other direction.

9. A machine for rolling loose material into a cylindrical bale and wrapping twine spirally lengthwise around said bale comprising, in combination, a change speed transmission having a variable speed output shaft, a bale forming mechanism connected in driven relation with said output shaft, a feed mechanism operable by said output shaft to feed bale material to said bale forming mechanism, a twine dispensing mechanism cooperable with said bale forming mechanism to effect said wrapping of binding material around a formed bale, a cycling mechanism for rendering said feed mechanism and said dispensing mechanism intermittently operative in alternate succession; and adjusting means for said transmission operatively connected with said cycling mechanism so that said transmission will be in a low speed driving condition when said feed mechanism is operative to feed bale material to said bale forming mechanism, and so that said transmission will be in a high speed driving condition when said dispensing mechanism is operative to effect said wrapping of binding material.

10. A machine as set forth in claim 9 and comprising a rotatable timing element forming part of said cycling mechanism, and a back and forth movable control element forming part of said transmission adjusting means and engageable with said timing element for actuation by the latter.

11. A machine for rolling loose material into a cylindrical bale and wrapping twine spirally lengthwise around said bale comprising, in combination, a change speed transmission having a variable speed output shaft, a bale forming mechanism connected in driven relation with said output shaft, a material feed mechanism in delivering relation to said bale forming mechanism, first selectively engageable and disengageable power transmitting means operatively interposed between said output shaft and said feed mechanism; a twine dispensing mechanism including a movable twine guide element; second selectively engageable and disengageable power transmitting means operatively interposed between said output shaft and said twine guide element; first and second control means for said first and second power transmitting means, respectively, operable sequentially so as to effect transmission of power to said feed mechanism without effecting transmission of power to said twine guide element, and so as to effect transmission of power to said twine guide element without effecting transmission of power to said feed mechanism; and adjusting means for said transmission operatively connected with one of said power transmitting means so that said transmission will be in a low speed driving condition during said transmission of power to said feed mechanism, and so that said transmission will be in a high speed driving condition during said transmission of power to said twine guide element.

12. A machine as set forth in claim 11 and wherein said adjusting means for said transmission are operatively connected with said second power transmitting means.

13. A machine as set forth in claim 11 and comprising an actuating member for said twine guide element rotatable in one direction upon engagement of said second power transmitting means; a back and forth movable control element operatively connected with said actuating member so as to be moved sequentially in one and then in another direction upon rotation of said actuating member in said one direction; and means operatively connected with said change speed transmission for adjusting the latter to said high and low speed driving conditions in response to movements of said control element in said one and in said other direction, respectively.

14. In a machine for rolling loose material into a cylindrical bale and wrapping twine spirally lengthwise around said bale, the combination of a change speed transmission having a variable speed output shaft, a bale forming mechanism connected in driven relation with said output shaft, a material feed mechanism in delivering relation to said bale forming mechanism, first selectively engageable and disengageable power transmitting means operatively interposed between said output shaft and said feed mechanism; a twine dispensing mechanism including a movable twine guide element; second selectively engageable and disengageable power transmitting means operatively interposed between said output shaft and said twine guide element; control means for said first and second power transmitting means adjustable to one operating condition effective to engage said first and to disengage said second power transmitting means, and to another operating condition effective to disengage said first and to engage said second power transmitting means; and adjusting means for said transmission operatively connected with said control means so that said transmission will be in a low speed driving condition when said control means are in said one operating condition, and so that said transmission will be in a high speed driving condition when said control means are in said other operating condition.

References Cited in the file of this patent

UNITED STATES PATENTS

| | | |
|---|---|---|
| 1,211,551 | Curtis | Jan. 9, 1917 |
| 2,178,712 | Whitney | Nov. 7, 1939 |
| 2,205,278 | Russell | June 18, 1940 |
| 2,336,491 | Leubben | Dec. 14, 1943 |
| 2,468,641 | Scranton et al. | Apr. 26, 1949 |